Sept. 17, 1963

N. S. REYNOLDS 3,103,787

PISTON CYLINDER ASSEMBLY

Filed July 17, 1961

INVENTOR:
NOEL S. REYNOLDS,
BY Kingsland, Rogers, Ezell + Robbins
ATTORNEYS

United States Patent Office 3,103,787
Patented Sept. 17, 1963

3,103,787
PISTON CYLINDER ASSEMBLY
Noel S. Reynolds, 636 Sherwood Drive,
Webster Groves, Mo.
Filed July 17, 1961, Ser. No. 124,409
4 Claims. (Cl. 60—54.6)

This invention relates to a power transmitting device comprising two members, a cylinder and a piston, wherein one of the members is slidable relative to the other, and particularly relates to a means for providing a substantially perfect seal between the piston and the cylinder wall to provide a maximum efficiency and response of the power element to changes in fluid pressure within the cylinder.

In essence, this invention incorporates a cylinder having a fluid chamber with a port through its side wall that provides communication between the fluid chamber and a source of fluid. A piston member is slidable within the cylinder, with the head of the piston defining a movable wall of the fluid chamber. There is a cup member of very soft rubber, plastic or other synthetic material that engages the side wall of the cylinder. A relatively much harder retainer or backer is positioned between the soft cup and the base of the piston. An expander assembly continually presses the side wall of the soft cup into sealing engagement with the cylindrical side wall of the cylinder. The combination of this pressure from the expander, together with the soft composition of the cup and the relatively greater area of frictional contact between the side wall of the cup and the side wall of the cylinder provides a seal against the passage of fluid out of the fluid chamber; this combination also provides a substantial lock against sliding movement of the side of the cup relative to the side wall of the cylinder when the fluid pressure augments the pressure metal expander.

The use of such a soft material in the cup composition is made possible by the retainer or backer. This retainer has a cylindrical, thin back that is positioned between the face of the piston and the cup, and the retainer has a peripheral flange or side wall that is sprung outwardly against the side wall of the cylinder. The retainer flange is positioned between the side wall of the cup and the side wall of the cylinder. This retainer or backer would be incapable of providing an adequate seal against the fluid within the cylinder chamber. It is capable, however, of providing a seal against the "semi-fluid" or soft material cup that would otherwise extrude or flow into the space between the side wall of the piston and the side wall of the cylinder. In other words, the soft cup provides a seal against the flow of the fluid and the retainer provides a seal against the flow of the cup. And because of this sealing quality of the retainer, the cup, under the influence of increasing fluid pressure within the cylinder chamber, expands, and the portion of the cup that faces the piston transforms the fluid pressure into sliding movement of the piston. At the same time, the side wall of the cup is held firmly pressed against the side wall of the cylinder and is prevented from sliding with the piston.

This invention has particular utility for automobile wheel cylinders wherein the fluid chamber is connected to a source of hydraulic fluid for operating the brakes on the wheel.

It is, therefore, an important object of this invention to provide a cylinder with a piston that is slidable in response to changes in volume or pressure of fluid within the cylinder chamber, and to provide a substantially perfect seal between the piston and the side wall of the cylinder.

More particularly, it is an object of the invention to provide a cylinder having a fluid chamber therein for receiving variable volumes of hydraulic fluid, a piston slidable within the cylinder under the influence of changing volumes and pressures of the hydraulic fluid, and a cup seal that engages the side wall of the cylinder; wherein the cup seal is of such a soft material that it is locked in one place against the side wall of the cylinder once fluid pressure is applied. A conjunctive object is to provide a retainer between the piston and the cup seal to prevent the flow or extrusion of the cup seal between the side walls of the piston and the cylinder.

Stated another way, it is an object of the invention to provide a totally enclosed fluid chamber with an expandable wall that is movable in response to variations in the volume and pressure of the fluid within the chamber to transmit sliding movements to a piston member that engages the expandable wall without substantial sliding movement of the flexible cup.

Another object is to provide a semi-sealed cylinder having a cup seal between a piston and the cylinder wall that is formed to comprise a semi-sealed cylinder which reduces the sliding movement of the cup, thereby reducing the danger of leakage that normally takes place past sliding cups or seals.

Still another object of the invention is to provide a fluid cylinder with a piston slidable therein and a cup seal between the piston and the cylinder wall wherein the cup is of such a soft material that it will project into pits and other surface irregularities on the cylinder wall under the pressure of fluid within the cylinder.

Other objects and advantages will be apparent to those skilled in the art.

In the drawings:
FIGURE 1 is a fragmentary side elevation view in longitudinal section of the cylinder and piston asembly;
FIGURE 2 is a fragmentary view in section on an enlarged scale showing a side of the retainer and cup detail;
FIGURE 3 is a plan view of the retainer; and
FIGURE 4 is a side view of the retainer.

Referring now to the drawing, this power device includes a cylinder 10 having a cylindrical side wall 11 and an end wall 12 that combine to define all but one wall of a fluid chamber 13. There is a port 14 through the side wall 11 of the cylinder 10, and this port 14 establishes communication between the chamber 13 and a source of fluid (not shown).

A piston member 15 is slidably disposed within the chamber adjacent its open end. This piston member 15 has a face 16 opposing the end 12 of the cylinder 10. The piston member 15 is continuously biased toward the end wall 12 of the cylinder 10 by a rod 17 that is connected to a work load or resistance. This work load is not shown in the drawing, but may be any work load that is to be driven by the movement of the piston member 15 away from the end wall 12 of the cylinder. An example of such a work load is the brakes on the wheel of an automobile. As can be seen, although in the drawing it may be exaggerated, there is a space 18 between the side wall of the piston member 15 and the side wall 11 of the cylinder 10. This space 18 is necessary to permit free sliding movement of the piston member 15, but, although it is usually quite small, the space 18 has heretofore limited the flexibility in cup design.

There is a hard plastic or metal retainer 19 having a back wall portion 20 that is pressed against the face 16 of the piston member 15. The retainer also has an annular flange or side wall 21 that surrounds the back wall 20 and extends toward the end wall 12 therefrom. While this base 20 is rigid, the side wall 21 is flexible to permit outward movement for engagement with the cylinder wall when expanding pressure is applied. The material is preferably metal, plastic, or other synthetic material. However, the flange or side wall 21 must spring outwardly when pressure is applied so that the side wall 21 exerts some pressure against the side wall 11 of the cylinder 10.

A cup 22 is positioned with its base 23 engaging the back wall 20 of the retainer 19. The cup has an annular side wall 24 that projects from the base 23 toward the end wall 12 of the cylinder 10. This side wall 24 has an outer surface 25 that contacts the side wall 11 of the cylinder 10. An annular portion 26 at the heel of the side wall 25 is angled to receive the flange 21 of the retainer 19.

A metal expander 27, that may be any of the conventional expanders, has a side wall portion 28 that is angled outwardly against the side wall 24 of the cup 22. The side wall 28 of the expander continually presses the side wall 24 of the cup 22 against the side wall 11 of the cylinder 10. A compression spring 29 bears against the end wall 12 of the cylinder 10 and against the expander 27 to assure the proper pressure of the expander against the cup 22.

The material of the cup 22 may be either rubber or plastic, but in either case the material should be soft with high elongation characteristics. It should preferably have a durometer hardness of about 25 to 45, but other hardnesses may be possible, extending to a very soft emulsion, so long as the cup provides a seal against the fluid in the cylinder and so long as the retainer 20 provides a seal against the cup. In addition, the cup must be of such a material that the side wall 24 of the cup will remain in place against the side wall 11 of the cylinder 10 under the pressure of fluid during at least half of the sliding movement of the piston member 15.

It should be noted that the cup is locked in place only when under the combined influence of expander and fluid pressure. When there is little or no fluid pressure, the cup is slidable within the cylinder for adjusting and releasing purposes. As soon as sufficient pressure is exerted upon the side wall of the cup, it locks against the wall of the cylinder and thereafter deforms with sliding movement of the piston 15.

While it is in some cases necessary for the cup to slide during the early stages of piston movement, it stops sliding and turns into a stretchable gasket as soon as sufficient fluid pressure is exerted to side wall of the cup to lock it against the cylinder wall. The proportion of sliding cup to stretching gasket can be controlled by a combination of the flexibility and friction characteristics of the rubber-like cup material and the angle and pressure of the expander holding it against the cylinder wall.

From the foregoing description, the operation of this power transmitting device should be apparent. A fluid is introduced into the chamber 13 by way of the port 14. This fluid may vary in volume, and therefore in pressure, according to its introduction into the chamber 13. As the volume of the fluid increases, it exerts a greater pressure against the base 23 of the cup 22 and against the side wall 24 of the cup 22. The pressure against the side wall 24 of the cup increases the frictional resistance to sliding movement between the surface 25 of the cup and the inner surface 11 of the cylinder 10. The soft nature of the cup material assures that this frictional engagement between the side wall of the cup and the side wall of the cylinder will cause the cup to stretch rather than slide in the cylinder. At the same time, the soft material cup can stretch and expand as the pressure of the hydraulic fluid increases. This expansion of the cup results in an exertion of pressure against the retainer 20 and against the face 16 of the piston member 15, causing the piston member 15 to move to the left, as viewed in FIGURE 1.

Normally, under the influence of this greater pressure of the fluid within the chamber 15, the heel portion of the cup 22 would tend to extrude or flow into the space 18 between the piston member 15 and the cylinder wall 11. This tendency to flow or extrude is greatly increased by the fact that the cup 22 is of such soft material. However, the flange 21 of the retainer 19 is sprung outwardly against the side wall 11 of the cylinder and provides an adequate seal against the flow of this soft material or semi-fluid cup 22.

When the fluid is withdrawn from the chamber 13, the resistance of the work forces on the rod 17 toward the end wall 12 of the cylinder, thereby returning the piston member 15 to the position illustrated in FIGURE 1.

This same sealing principle may also be used to service oversized cylinders where there is too much clearance between the piston and cylinder to permit safe operation of normal cups. Present materials available make possible the use of standard pistons with cylinders worn up to .030″ oversize.

It also makes possible the use of pitted cylinders by reducing the sliding movement of cups to a minimum.

While the invention has been described in conjunction with a single end cylinder, it has equal significance with double-end cylinders having two pistons slidable therein. As is known, each piston has its own cup seal so that the incorporation of this invention into a double-end cylinder would include the provision of a soft cup and a hard retainer for each piston.

Various changes and modifications may be made within the process of this invention as will be readily apparent to those skilled in the art. Such changes and modifications are within the scope and teaching of this invention as defined by the claims appended hereto.

What is claimed is:

1. A hydraulic power-transmitting device comprising two members, a piston and a cylinder, one of the members being slidable relative to the other member, backer means positioned adjacent the face of the piston, a fluid chamber within the cylinder, one wall of which is defined by the piston, a port through the cylinder wall for admitting hydraulic fluid into the chamber, a soft material cup member of less than fifty durometer hardness, the cup member having a base positioned adjacent the backer means and having an annular side wall that bears against the side wall of the cylinder, an expander for biasing the side wall of the cup member against the side wall of the cylinder, the cup member being of a sufficiently soft mtaerial that, when subjected to substantial fluid pressure within the chamber a substantial lock is applied by the annular side wall of the cup against the side wall of the cylinder to substantially prevent movement of the side wall of the cup relative to the side wall of the cylinder, and to cause the base of the cup member to expand and move the piston in response to the said substantial fluid pressure, the backer means having a side wall in contact with the side wall of the fluid chamber for preventing extrusion or flow of the cup into the space between the cylinder wall and the piston wall.

2. A hydraulic power transmitting device comprising a cylinder with a piston slidable within the cylinder, the piston and the cylinder defining together a hydraulic fluid chamber with a port through a side wall of the cylinder for admitting hydraulic fluid into the chamber, a soft material cup having an annular side wall pressed against the side wall of the cylinder, an expander biasing the side wall of the cup against the side wall of the cylinder, a compression spring for biasing the expander against the cup, and a retainer positioned between the cup and the base of the piston for preventing extrusions of the cup into the space between the side wall of the piston and the side wall of the cylinder, the cup being of a sufficiently soft material to provide a substantial lock against relative sliding movement along the side wall of the cylinder upon increase of fluid pressure within the chamber, the cup also being sufficiently soft and flexible to cause elongation of the cup upon increase of fluid pressure within the chamber, the retainer having a side wall sprung against the side wall of the cylinder, the retainer being of much harder material than the cup to prevent extrusion of the cup between the piston and the cylinder.

3. The combination of claim 1 wherein the side wall of the backer means is biased against the side wall of the chamber and maintains contact with the side wall of the chamber even after the chamber enlarges with wear.

4. The combination of claim 1 wherein the backer means includes a base between the face of the piston and the cup and the side wall of the backer means comprises an annular flange extending from the base and positioned between the annular side wall of the cup member and the side wall of the cylinder.

References Cited in the file of this patent

UNITED STATES PATENTS

| | | |
|---|---|---|
| 2,242,542 | Peterson et al. | May 20, 1941 |
| 2,371,554 | Scott-Iversen | Mar. 13, 1945 |
| 2,383,959 | Dick | Sept. 4, 1945 |
| 2,385,406 | Dayton | Sept. 25, 1945 |
| 2,752,755 | Goepfrich | July 3, 1956 |
| 2,884,292 | Doner | Apr. 28, 1959 |
| 2,914,368 | Farmer et al. | Nov. 24, 1959 |
| 2,963,330 | Arnes | Dec. 6, 1960 |